(12) United States Patent
Hara

(10) Patent No.: US 8,051,962 B2
(45) Date of Patent: Nov. 8, 2011

(54) STEERING DAMPER

(75) Inventor: Tadashi Hara, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 727 days.

(21) Appl. No.: 12/071,553

(22) Filed: Feb. 22, 2008

(65) Prior Publication Data

US 2008/0202876 A1    Aug. 28, 2008

(30) Foreign Application Priority Data

Feb. 23, 2007 (JP) ................. 2007-043687

(51) Int. Cl.
*F16F 9/14* (2006.01)
(52) U.S. Cl. ...................................... 188/306; 188/310
(58) Field of Classification Search .............. 188/312, 188/306, 310; 280/272
See application file for complete search history.

(56) References Cited

U.S. PATENT DOCUMENTS

| | | | | |
|---|---|---|---|---|
| 5,662,046 | A * | 9/1997 | Wright et al. | 105/167 |
| 5,927,740 | A | 7/1999 | Hopey | |
| 7,021,433 | B2 * | 4/2006 | Yamada et al. | 188/294 |
| 2004/0046351 | A1 | 3/2004 | Morgan et al. | |
| 2005/0151341 | A1 * | 7/2005 | Iwamoto et al. | 280/272 |
| 2006/0207845 | A1 | 9/2006 | Gogo et al. | |

FOREIGN PATENT DOCUMENTS

| | | |
|---|---|---|
| DE | 1855938 | 8/1962 |
| EP | 1323946 | 7/2003 |
| JP | 2006-015853 | 1/2006 |

* cited by examiner

*Primary Examiner* — Bradley King
(74) *Attorney, Agent, or Firm* — Rabin & Berdo, PC

(57) ABSTRACT

A steering damper comprises two oil chambers (R1, R2) delimited in a housing (1, 7) by a partitioning member (2, 8), and a damping valve (2a, 2b) which imposes a drag on a flow of working oil between the two oil chambers (R1, R2). By further comprising an oil passage (5) connecting the two oil chambers (R1, R2), a pair of check valves (5a, 5b) which prevents oil flow from each of the two oil chambers (R1, R2) into the oil passage (5), and a bypass passage (6) connected to the oil passage (5) between the pair of check valves (5a, 5b) and having an opening that opens onto the interior of the housing (1) in the vicinity of the neutral position of the movable partitioning member (2, 8), the steering damper enables the movable partitioning member (2, 8) to return quickly towards the neutral position.

4 Claims, 1 Drawing Sheet

STEERING DAMPER

FIELD OF THE INVENTION

This invention relates to a steering damper for suppressing unintended yaw of a front wheel and handlebars of a motor cycle.

BACKGROUND OF THE INVENTION

JP2006-015853 A, published by the Japan Patent Office in 2006, proposes a rotary steering damper for suppressing unintended yaw or yaw oscillation of a front wheel of a motor (cycle while running.

The steering damper comprises two oil chambers delimited by a vane serving as a movable partitioning member in a housing thereof. The vane has equal pressure receiving areas on which hydraulic pressure in the respective oil chambers is received. The two oil clambers are arranged to communicate with each other via a passage provided outside the housing and equipped with a damping valve.

The housing is fixed to handlebars of the motor cycle whereas the vane is fixed to a vehicle body of the motor cycle. When the handlebars are steered, the vane oscillates in the housing and working oil flows in the passage between the two oil chambers delimited by the vane i.e., from a shrinking oil chamber to an expanding oil chamber, and the damping valve imposes a drag on the flow of working oil, thereby generating a damping force.

According to the prior art steering damper, unintended yaw or yaw oscillation of the front wheel and handlebars due to shimmy or kickback can be suppressed by properly setting a cracking pressure of the damping valve.

SUMMARY OF THE INVENTION

When the front wheel of the motor cycle undergoes a kickback while running, the vane tends to rotate greatly at a high speed in the housing of the steering damper. The damping valve imposes a drag on the flow of working oil promoted by this rotation of the vane, thereby damping unintended yaw of the front wheel.

Once the yaw of the front wheel has been damped, it is preferable to return the handlebars and the front fork to a neutral position promptly. According to the prior art steering damper, however, the flow of working oil promoted by the vane while returning to the neutral position is also formed through the damping valve. As a result, a damping force is generated in the prior art steering damper even when the front wheel and handlebars are returning to the neutral position, which makes the operation of the handlebars heavy. This tendency becomes more prominent as the damping performance of the steering damper increases.

It is therefore an object of this invention to enable the front wheel and handlebars of a motor cycle to return quickly to a neutral position after an unintended yaw of the same has been damped.

In order to achieve the above object, this invention provides a steering damper comprising a housing filled with working oil, a movable partitioning member housed in the housing so as to be free to slide about a neutral position while delimiting two oil chambers in the housing, a damping valve which imposes a drag on a flow of working oil between the two oil chambers, an oil passage connecting the two oil chambers, a pair of check valves which allow working oil to flow from the oil passage into each of the oil chambers while preventing working oil from flowing from each of the oil chambers into the oil passage, and a bypass passage connected to the oil passage between the pair of check valves and having an opening that opens onto the interior of the housing in the vicinity of the neutral position of the movable partitioning member.

The details as well as other features and advantages of this invention are set forth in the remainder of the specification and are shown in the accompanying drawings.

DESCRIPTION OF THE PREFERRED EMBODIMENTS

Figure 1:
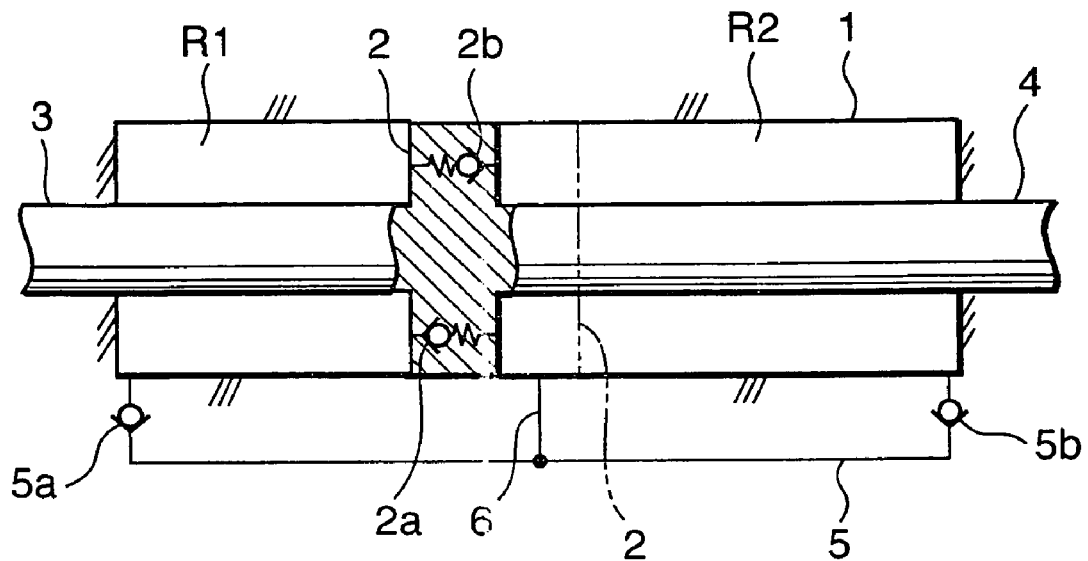
FIG. 1 is a schematic longitudinal sectional view of a linear steering damper according to this invention.

Referring to FIG. 1 of the drawings, a double-rod type linear steering damper comprises a cylinder 1 as a housing filled with working oil. The cylinder 1 accommodates a piston 2 as a movable partitioning member. The piston 2 has a sliding part which slides axially on the inner circumferential surface of the cylinder 1. The piston 2 delimits two oil chambers R1 and R2 within the cylinder 1. The dotted line in the figure denotes a right end face of the piston 2 when a neutral position.

A rod 3 and a rod 4 having equal dimensions are fixed to two respective axial ends of the piston 2 coaxially with the cylinder 1. The tip of the rod 3 and the tip of the rod 4 project outward respectively from the cylinder 1 in the axial directions. The piston 2 thus constructed has equal pressure receiving areas for receiving the hydraulic pressure in the oil chambers R1 and R2.

The piston 2 is provided with damping valves 2a and 2b in the interior thereof. The damping valves 2a allow a flow of working oil from the oil chamber R1 to the oil chamber R2 and generate a damping force by imposing a drag on the flow of working oil, while preventing a flow of working oil in the opposite direction. The damping valve 2b allows a flow of working oil from the oil chamber R2 to the oil chamber R1 and generates a damping force by imposing a drag on the flow of working oil, while preventing a flow of working oil in the opposite direction.

The steering damper further comprises an oil passage 5 connecting the oil chambers R1 and R2 on the exterior of the cylinder 1.

A check valve 5a is installed in the oil passage 5 nearby the oil chamber R1. The check valve 5a prevents working oil in the oil chamber R1 from flowing out to the oil passage 5 while allowing working oil in the oil passage 5 to flow into the oil chamber R1. A check valve 5b is installed in the oil passage 5 nearby the oil chamber R2. The check valve 5b prevents working oil in the oil chamber R2 from flowing out to the oil passage 5 while allowing working oil in the oil passage 5 to flow into the oil chamber R2.

When the steering damper is fitted onto a motor cycle, for example, the cylinder 1 is connected to a fuel tank, which is a part of the vehicle body of the motor cycle, whereas the rod 3 or the rod 4 is connected to an upper bracket of the front fork which is fixed to handlebars of the motor cycle. When the handlebars are steered in this configuration, the piston 2 slides in the cylinder 1 and working oil flows between the oil chambers R1 and R2 through the damping valve 2a or 2b, depending on the steering direction of the handlebars.

When for example the piston 2 strokes from the neutral position towards the left hand side in the cylinder 1 in the figure, working oil in the oil chamber R1, which is prevented from flowing into the oil passage 5 by the check valve 5a, flows into the oil chamber R2 via the damping valve 2a in the piston 2. The damping valve 2a generates a damping force by imposing a drag on the flow of working oil passing therethrough from the oil chamber R1 to the oil chamber R2.

In contrast, when the piston 2 strokes from the neutral position towards the right hand side in the cylinder 1 in the figure, working oil in the oil chamber R2, which is prevented from flowing into the oil passage 5 by the check valve 5b, flows into the oil chamber R1 via the damping valve 2b in the piston 2. The damping valve 2b generates a damping force by imposing a drag on the flow of working oil passing therethrough from the oil chamber R2 to the oil chamber R1.

The steering damper further comprises a bypass passage 6. The bypass passage 6 bypasses the check valves 5a and 5b to connect the passage 5 and the interior of the cylinder 1 directly. The bypass passage 6 has an opening that opens onto the interior of the cylinder 1 at a midpoint of the cylinder 1 in the axial direction, which corresponds to the neutral position of the piston 2.

When the piston 2 is in the neutral position or the vicinity thereof, the opening of the bypass passage 6 is closed by the piston 2.

The opening of the bypass passage 6 onto the interior of the cylinder 1 is formed in a circular shape. Alternatively, the opening may be formed in a ring shape. The dimension of the opening, i.e. the outer diameter of the circle or the ring, is set to be smaller than the length of the sliding part of the piston 2 in the axial direction. Preferably, the outer diameter of the circle or the ring is set equal to or smaller than one half of the length of the sliding part in the axial direction.

When the piston 2 strokes in the cylinder 1 from the neutral position or the vicinity thereof towards the left hand side in the figure, working oil in the shrinking oil chamber R1 flows into the expanding oil chamber R2 via the damping valve 2a, and the damping valve 2a generates a damping force corresponding to the flow velocity.

Since the oil chamber R2 is connected to the bypass passage 6, working oil in the oil chamber R2 flows out to the oil passage 5 via the bypass passage 6 without resistance and then flows into the oil chamber R1 via the check valve 5a when the piston 2 in the stroke position shown by the solid line in the figure strokes in the cylinder 1 towards the right hand side in the figure.

A similar result is obtained when the piston 2 strokes in the cylinder from the neutral position or the vicinity thereof towards the right hand side in the figure. Specifically, working oil in the oil chamber R2 flows into the oil chamber R1 via the damping valve 2b and the damping valve 2b generates a damping force corresponding to the flow velocity. Thereafter, since the oil chamber R1 is connected to the bypass passage 6, working oil in the oil chamber R1 flows out to the oil passage 5 via the bypass passage 6 without resistance and then flows into the oil chamber R2 via the check valve 5b when the piston 2 strokes in the cylinder 1 towards the left hand side in the figure.

In other words, when the piston 2 strokes from the neutral position or the vicinity thereof towards any direction, a damping force is generated in accordance with the flow velocity, as in the case of the prior art steering damper. However, when the piston 2 returns from a stroke position distant from the neutral position towards the neutral position, the piston 2 displaces without resistance.

Accordingly, when the piston 2 greatly strokes at a high speed due to a kickback of the front wheel of the motor cycle, for example, the damping valve 2a or 2b damps the stroke of the piston 2. Once the kickback is absorbed by the steering damper, the front wheel and handlebars tend to return to their original position. In this steering damper, the piston 2 in a stroke position distant from the neutral position in the cylinder 1 returns to the neutral position without resistance. As a result, the front wheel and handlebars, having been subjected to unintended yaw due to kickback, return to the neutral position quickly. When the piston 2 returns to the neutral position in the cylinder 1, the bypass passage 6 is closed again. According to this steering damper, a quick return of the handlebars is thus ensured while suppressing unintended yaw of the front wheel of the motor cycle.

When the piston 2 displaces within a range in which the bypass passage 6 is closed by the piston 2, or in other words when the piston 2 oscillates about the neutral position within a small amplitude, the damping valve 2a or 2b generates a damping force irrespective of the direction of oscillation. This steering damper thus functions similarly to the prior art steering damper with respect to suppression of shimmy of the front wheel.

Figure 2:
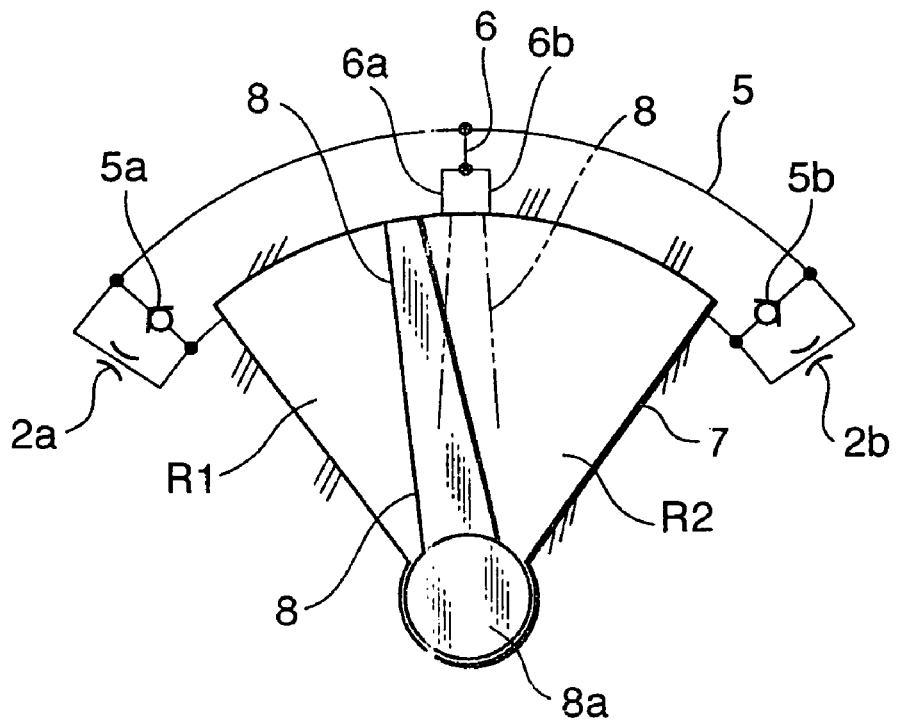
FIG. 2 is a schematic longitudinal sectional view of a rotary steering damper according to another embodiment of this invention.

Referring to FIG. 2, another embodiment of this invention will be described.

In this embodiment, the steering damper is constituted by a rotary damper as in the case of the prior art steering damper.

The steering damper comprises a vane 8 serving as a movable partitioning member enclosed in a fan-shaped inner space of a housing 7. A base 8a of the vane 8 is supported by the housing 7 so as to be free to swing. The vane 8 has a sliding part on its tip which slides on the inner circumferential surface of the housing 7 in a circumferential direction. The housing 7 is filled with working oil and the vane 8 delimits two oil chambers R1 and R2 in the housing 7. The vane 8 has equal pressure receiving areas for receiving the hydraulic pressure in the oil chambers R1 and R2.

The two oil chambers R1 and R2 communicate with each other via an oil passage 5 provided on the exterior of the housing 7, and check valves 5a and 5b are installed in the oil passage 5 as in the case of the first embodiment. Further, damping valves 2a and 2b each of which is constituted by an orifice are provided in parallel with the check valves 5a and 5b, respectively.

When the steering damper is fitted onto the motor cycle, for example, the housing 7 is fixed to the bracket which connects the upper end of the front fork to the handlebars, whereas the base 8a of the vane 8 is fixed to the vehicle body. When the handlebars are steered in this state, the vane rotates in the housing 7 and working oil flows between the oil chambers R1 and R2.

The housing 7 may be fixed to any of the upper surface and the lower surface of the bracket. The housing 7 and the bracket may be constructed in one piece. Further, the base 8a of the vane 8 may be fixed to the bracket and the housing 7 to the vehicle body.

When the vane 8 rotates in the housing 7 anti-clockwise from a neutral position shown by the dotted line in the figure or the vicinity thereof, working oil in the oil chamber R1, which is prevented from flowing out to the oil passage 5 by the check valve 5a, flows out to the oil passage 5 via the damping valve 2a which is parallel to the check valve 5a, and then flows into the oil chamber R2 via the check valve 5b. The damping valve 2a generates a damping force by imposing a drag on the flow of working oil passing there-through.

When the vane 8 rotates in the housing clockwise from the neutral position or the vicinity thereof, working oil in the oil chamber R2, which is prevented from flowing out to the passage 5 by the check valve 5b, flows out to the oil passage 5 via the damping valve 2b which is parallel to the check valve 5b, and then flows into the oil chamber R1 via the check valve 5a. The damping valve 2b generates a damping force by imposing a drag on the flow of working oil passing therethrough.

The steering damper further comprises a bypass passage 6. An end of the bypass passage 6 is connected to the passage 5 between the check valves 5a and 5b. Another end of the bypass passage 6 branches off to branches 6a and 6b. When the vane 8 is in the neutral position, openings of the branches 6a and 6b are located on both sides of the vane 8 and connected to the oil chambers R1 and R2, respectively, The openings of the branches 6a and 6b, which open onto the interior of the housing 7 are formed in a circular shape. Alternatively, the openings may be formed in a ring shape. The dimension of the openings, or in other words the outer diameter of the circle or the ring, is set to be smaller than the circumferential length of the sliding part of the vane 8.

When the vane rotates anti-clockwise in the figure in the housing 7 as shown by the solid line in the figure from the neutral position or the vicinity thereof, working oil in the shrinking oil chamber R1 flows into the expanding oil chamber R2 via the damping valve 2a, and the damping valve 2a generates a damping force corresponding to the flow velocity.

Since the oil chamber R2 is connected to the bypass passage 6, working oil in the shrinking oil chamber R2 flows out to the passage 5 via the bypass passage 6 without resistance, and then flows into the expanding oil chamber R1 via the check valve 5a when the vane 8 in the rotation position shown by the solid line in the figure rotates in the housing 7 clockwise.

Similarly, when the vane 8 rotates clockwise in the figure from the neutral position or the vicinity thereof, working oil in the shrinking oil chamber R2 flows into the expanding oil chamber R1 via the damping valve 2b, and the damping valve 2b generates a damping force corresponding to the flow velocity. Thereafter, since the oil chamber R1 is connected to the bypass passage 6, working oil in the shrinking oil chamber R1 flows out to the oil passage 5 via the bypass passage 6 without resistance, and then flows into the expanding oil chamber R2 via the check valve 5b when the vane 8 in a rotation position distant from the neutral position rotates anti-clockwise in the figure.

To summarize the above, when the vane 8 greatly rotates at a high speed due to kickback of the front wheel of the motor cycle, for example, the damping valve 2a or 2b damps the rotation of the vane 8. Once the kickback is absorbed by the steering damper, the front wheel tends to return to its original position. The vane 8 in a stroke position distant from the neutral position in the housing 7 returns to the neutral position without resistance. As a result, the front wheel and handlebars, having been subjected to an unintended yaw due to kickback of the front wheel, returns to the neutral position quickly.

Unlike the first embodiment, when the vane 8 is in the neutral position, the bypass passage 6 maintains a connected state to the oil chambers R1 and R2 via the branches 6A and 6B, respectively.

As a result, the vane 8 oscillates without resistance within a range that does not close any of the branches 6a and 6b. This configuration of the bypass passage 6 is preferable in view of ensuring an allowance with respect to the operation of the handlebars about the neutral position, although shimmy of the front wheel cannot be suppressed.

As described above, the steering damper according to this invention damps an unintended yaw of the front wheel and handle bars of a motor cycle during running, especially a great high speed yaw due to a kickback, but it does not exert a resistance on the front wheel and handlebars when they return to the neutral position after damping the yaw. As a result, a quick return of the front wheel and handlebars after they undergo unintended yaw is ensured. A preferable steering characteristics may thereby be realized for the riders of motor cycles who have a peculiar interest in the controllability of handlebars.

The contents of Tokugan 2007-043687A, with a filing date of Feb. 23, 2007 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

For example, although the damping valves 2a and 2b are provided in the piston 2 in the first embodiment, it is possible to install the damping valves 2a and 2b in the passage 5 as in the case of the second embodiment. It is also possible to provide the damping valves 2a and 2b in bearings which support the rods 3 and 4 so as to be free to slide while closing both ends of the cylinder 1. The check valves 5a and 5b may also be provided in the bearings.

Although the steering dampers according to the embodiments described above are not provided with an accumulator for compensating for the working oil temperature, needless to say the present invention can be applied effectively to steering dampers provided with an accumulator for compensating for the working oil temperature.

The embodiments of this invention in which an exclusive property or privilege is claimed are defined as follows:

What is claimed is:
1. A steering damper comprising:
a housing having a fan-shaped inner space filled with working oil;
a vane housed in the housing so as to freely oscillate within the fan-shaped inner space about a neutral position;
a first oil chamber delimited by the vane;
a second oil chamber delimited by the vane;
a damping valve connecting the first oil chamber and the second oil chamber, the damping valve for imposing a drag on a flow of working oil between the first oil chamber and the second oil chamber;
an oil passage connecting the first oil chamber and the second oil chamber;
a pair of check valves disposed in the oil passage, the pair of check valves for allowing working oil to flow from the oil passage into the first oil chamber and the second oil chamber while preventing working oil from flowing from the first oil chamber and the second oil chamber into the oil passage; and
a bypass passage connected to the oil passage between the pair of check valves and comprising a first branch opening onto the first oil chamber and on a first side of the vane when the vane is in the neutral position, and a second branch opening onto the second oil chamber and on a second side of the vane when the vane is in the neutral position,
when the vane oscillates in a direction towards the neutral position to thereby cause one of the first oil chamber and the second oil chamber to shrink, the shrinking first or second oil chamber is connected to the oil passage through the bypass passage, and when the vane oscillates in a direction away from the neutral position to thereby cause one of the first oil chamber and the second oil chamber to shrink, the vane prevents the shrinking first or second oil chamber from connecting to the oil passage through the bypass passage.

2. The steering damper as defined in claim 1, wherein the vane has equal pressure receiving areas for receiving hydraulic pressure in the first oil chamber and the second oil chamber.

3. The steering damper as defined in claim 1, wherein the damping valve comprises a first valve including a first orifice and a second valve including a second orifice, wherein the first valve is disposed in parallel with a first of the check valves, and the second valve is disposed in parallel with a second of the check valves, wherein the first valve connects the first oil chamber to the oil passage, and the second valve connects the second oil chamber to the oil passage.

4. The steering damper as defined in claim 1, wherein the vane prevents the shrinking first or second oil chamber from connecting to the oil passage through the bypass passage by delimiting the shrinking first or second oil chamber such that each of the openings of the branches open onto the first or second oil chamber that is not shrinking.

* * * * *